United States Patent [19]

Morris et al.

[11] Patent Number: 4,909,955
[45] Date of Patent: Mar. 20, 1990

[54] LEAD-OXIDE PASTE MIX FOR BATTERY GRIDS AND METHOD OF PREPARATION

[75] Inventors: Chris Morris; Ajoy Datta, both of Austin, Tex.; Paul L. Howard, Greensboro, Md.

[73] Assignee: Electrosource, Inc., Austin, Tex.

[21] Appl. No.: 267,369

[22] Filed: Nov. 4, 1988

[51] Int. Cl.⁴ .............................................. H01M 4/62
[52] U.S. Cl. .................................. 252/182.1; 141/32; 141/1.1
[58] Field of Search ................ 252/182.1; 141/32, 1.1

[56] References Cited

U.S. PATENT DOCUMENTS

| | | | |
|---|---|---|---|
| 1,006,774 | 10/1911 | Morrison | 141/1.1 |
| 1,228,546 | 6/1917 | Flanders | 252/182.1 |
| 2,217,814 | 10/1940 | Pritchard et al. | 252/182.1 |
| 2,233,281 | 2/1941 | Brown et al. | 252/182.1 |
| 2,345,035 | 3/1944 | Daily et al. | 252/182.1 |
| 2,436,299 | 2/1948 | Hindall | 252/182.1 |
| 2,665,323 | 1/1954 | McFarlane | 252/182.1 |
| 2,728,808 | 12/1955 | Koerner et al. | 252/182.1 |
| 2,938,063 | 5/1960 | Greenburg et al. | 252/182.1 |
| 3,630,781 | 12/1971 | Rampel | 141/1.1 X |
| 3,830,661 | 8/1974 | Tsuchida et al. | 252/182.1 |
| 3,898,099 | 8/1975 | Baker et al. | 252/182.1 |
| 4,216,045 | 8/1980 | Morioka | 252/182.1 X |
| 4,315,829 | 2/1982 | Duddy et al. | 252/182.1 |
| 4,323,470 | 4/1982 | Mahato et al. | 252/182.1 |

Primary Examiner—John F. Terapane
Assistant Examiner—Valerie Fee
Attorney, Agent, or Firm—Arnold, White & Durkee

[57] ABSTRACT

A lead-oxide paste mix for use as an active material superimposed upon the plates of a lead-acid rechargeable battery. Battery grades of oxides of lead are mixed with a dilute solution of hydrogen peroxide, either alone or with additives and/or expanders. The resultant paste offers such advantages as reduced curing and drying times and/or the elimination of the need for curing and drying, lower dry active material weights and improved cohesion when compared to conventional pastes manufactured from leady oxides, sulfuric acid, and water.

15 Claims, 1 Drawing Sheet

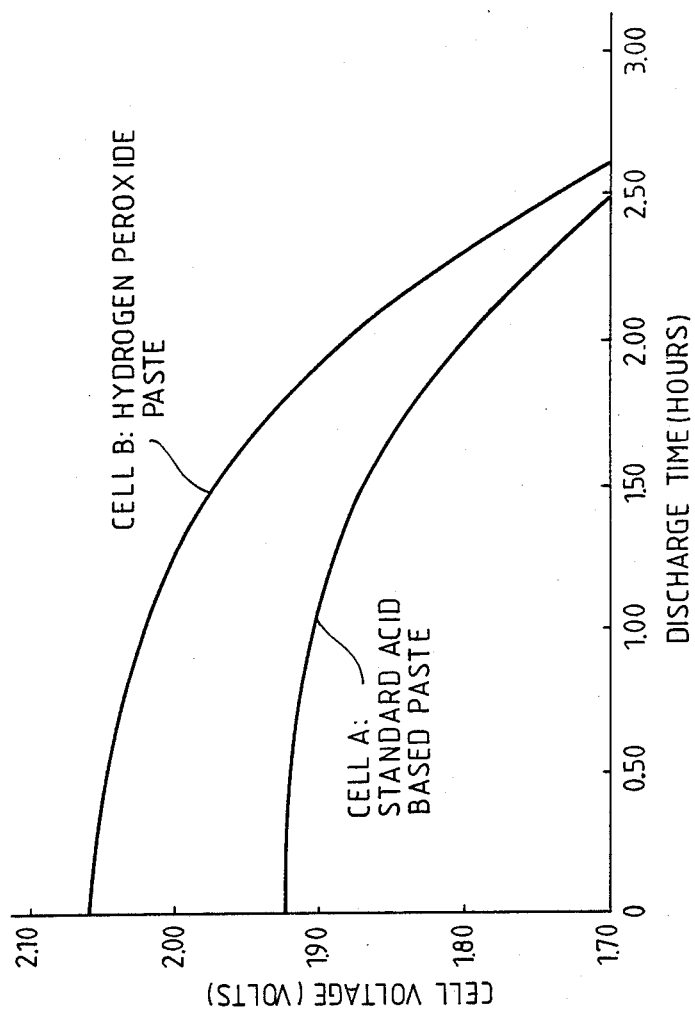

LEAD-OXIDE PASTE MIX FOR BATTERY GRIDS AND METHOD OF PREPARATION

BACKGROUND OF THE INVENTION

The present invention relates to lead-acid batteries and, more particularly, it relates to paste mixes used as active materials in batteries.

From early on in its history, the lead acid rechargeable battery industry has mixed water and/or dilute sulfuric acid when mixing various types of battery-grade, lead-lead oxide powder to form pastes. These pastes are used to make plates which are assembled into a battery. In recent years, increased demand for powders has resulted in changes in powder composition. These changes have forced the battery industry to modify the processes involved in preparing active battery plate pastes from the powders.

Originally, the batch process, used in making battery-grade lead oxides, produced lead oxides known as "Barton Oxides." These oxides had essentially no "free lead," which resulted in a simple curing process for producing the unformed active material paste. As the demand for battery-grade oxides increased it became necessary to speed up and mechanize the process of manufacturing oxides. This mechanization, however, has resulted in the formation of powders having lower lead oxides, and a larger portion (about 15% to 30%) of free lead. The particle size of the powders is either controlled during the oxidation process or arrived at by a separation process.

The manufacture of new battery-grade lead oxides has necessitated new paste mixing and curing processes. Specifically, it has become necessary to allow for a certain curing period after pasting the battery plates, in order to allow for the free lead in the oxide powders to oxidize to a level below 5% and nearer 1%. Failure to oxidize the free lead to below 5% may result in unacceptably formed plates. This is particularly true when using such powders in conventional water and/or acid mixed wastes. The pastes must be cured to avoid this problem. But, the curing process is time consuming and costly. Typically, a curing cycle of up to three days is required to arrive at a free lead content below 5% and preferably not more than 1%. Further, this curing process must be done under rigidly controlled temperature and humidity conditions.

Over the years, many additives and/or expanders have been used in fabricating battery pastes. Some of these additives have been used as bulking agents to maintain uniformity of plate density. Some have been used to optimize active material porosity, which may range from 35% to 50%. This is roughly equivalent to a paste density range of 79 to 62 g/in$^3$ (respectively) with conventional acid base pastes. Densities less than this in positive plate use tend toward excessive paste shedding and reduced life.

Among the additives that have been used in battery pastes is one described in U.S. Pat. No. 4,315,829 to Joseph C. Duddy et al. This patent describes the use of polyfluoroethylene as an additive, used in mixing leady oxides with water and 1.400 s.g. acid. A specific additive mentioned there is Teflon 30TFE ($\frac{1}{8}$ to 5%).

In general, battery manufacturers have been able to maintain plate quality in spite of changes in the composition of lead oxide powders. As a consequence, the improvements made in the energy density capabilities of lead-acid batteries have not come from plate composition. Instead, these improvements have come from physical changes such as lighter case materials and improved connectors to reduce overall weight.

SUMMARY OF THE INVENTION

The present invention addresses the above considerations by providing a paste which performs equal to, or better than, present pastes at the same or even less paste densities. The paste fabricated according to the present invention is also capable of achieving similar or improved operating life at higher active material porosity than is presently practical. In accordance with the present invention, the long curing cycles that are necessary with conventional water and/or acid mixed pastes are reduced or even eliminated. By reducing or eliminating the curing cycle, this invention also helps to reduce possible lead dust in the air.

In a general aspect, the present invention comprises a method of making a lead oxide battery paste. In accordance with this aspect of the invention, hydrogen peroxide is used when mixing battery grade lead oxides to convert free lead in the oxides to one of the lower oxides. It has been found that hydrogen peroxide: (1) produces a product which has an active material performance which is the same as, or exceeds, conventional products; (2) reduces or eliminates the curing/drying cycle; (3) reduces or eliminates the undesirable crystal structure sometimes found in the water and/or acid based pastes; and (4) makes feasible the use of reduced wet paste densities.

Expanders and/or other additives may also be used in the mix formulations according to this invention Lead particles act as autoxidants in the presence of hydrogen peroxide ($H_2O_2$) and oxygen to form a continuous chain reaction whereby essentially all the free lead in any given past enters into the reaction to produce lead monoxide (PbO) until the free lead is completely oxidized.

The amount of hydrogen peroxide used in practicing the inventions should be sufficient to form a paste and also to react with unreacted, elemental lead in the paste. It has been found that commercial grade hydrogen peroxide, from 10% to 20% by weight of dry oxide, forms very satisfactory past mixes with substantially no remaining elemental lead. Preferred, hydrogen peroxide strengths are between about 3 and 5 percent by weight, although stronger concentrations may be employed with care. The strength of the hydrogen peroxide and its proportion in any given paste may be varied considerably without detracting from the results obtained.

The mixing to form the paste is generally carried out at temperatures between about 15° C. and 50° C. However, temperatures outside this range may be employed, consistent with satisfactory paste formation.

The pastes produced by the invention are essentially all lead oxide. Plates prepared from these pastes may be assembled in batteries directly after pasting, without a curing period. The assembled batteries may then be directly filled with acid and initial charged. Alternatively, the plates may be dried and stored for assembly into batteries as needed. Drying the paste in open air typically takes up to 24 hours. However, the drying process may be accelerated using drying ovens.

Plates may be fabricated from pastes prepared in accordance with the invention directly after pasting. The problems associated with similar use of freshly pasted acid-based pastes having high levels of free lead would be reduced or even eliminated. Pastes with densities of less than 62 g/cu. in. (and down to about 50 g/cu. in.) have become feasible in accordance with the present invention.

Through the use of hydrogen peroxide, a paste is provided which has excellent adhesion to the grid wires of a battery plate. Sulfuric acid is often used in the formation of conventional battery pastes to convert some of the lead oxide to lead sulfate and form compounds during curing and drying. The lead sulfate formed imparts cementing action and allows for adhesion of the paste to grid wires.

It is not considered necessary that sulfuric acid be used with hydrogen peroxide in battery paste. However, in some situations, as for example when high temperature is undesirable after initial filling charging, sulfuric acid may be used with hydrogen peroxide in the paste mix so as to reduce the gravity of the filling acid required and the resultant initial temperature rise.

In addition to making satisfactory pastes in reduced times, the present invention addresses the needs of those skilled in the art of lead-acid battery design and manufacture to develop a paste which: (1) is suitable for mixing in conventional, readily available paste mixing equipment; (2) is suitable for pasting into conventional grid structures using conventional readily available pasting machines; (3) provides a usable plate in less than 24 hours; (4) produces a lower, dry, active material density (g/in.$^3$ and a higher percent porosity than those presently obtainable; (5) produces a dry active material with improved cycling capabilities at lower densities; (6) reduces or eliminates the use of sulfuric acid in the paste mixing process (thus reducing or eliminating handling problems and effects on equipment and personnel); (7) reduces the required mixing time (in comparison with those paste mixes containing sulfuric acid). The reduction in mixing time is due, in part, to the reduction or elimination of the need to control potentially harmful heat generation.

BRIEF DESCRIPTION OF THE DRAWING

A preferred method for carrying out the present invention, and of the manner of implementing and using it, is provided by the following detailed description taken together with FIG. 1. FIG. 1 shows curves of cell voltage versus discharge time for a conventional cell using standard acid-based paste and, a cell using paste prepared in accordance with the present invention.

DETAILED DESCRIPTION OF THE INVENTION

As stated previously, the present invention embodies the use of hydrogen peroxide in lieu of water and/or acid for mixing battery grade lead oxides into workable pastes for pasting battery plates. As with the water and/or acid plates, additives and/or expanders may or may not be used depending on the end use of the battery. A typical expander, ANZON 4640, is a commercially available blend of barium sulfate, carbon black, and lignin. Binder additives include TEFLON, cellulose and fiberglass.

ANZON 4640 is available from Anzon, Inc. Cellulose is available as KLUCEL hydroxypropylcellulose (non-ionic water-soluble polymer) from Aqualon Company; or as Solka-Floc BW-40 from James River Corp.; or as Alpha-Cel, Grade C, from International Filler Corp.

Binders such as TEFLON, cellulose and fiberglass help to impart strength, improve flow characteristics, or acid absorption of battery pastes. Red lead ($Pb_3O_4$) is also used in battery pastes, since during initial charge, red lead easily converts to a form of lead dioxide which exhibits enhanced electrical performance during early test cycles.

The following examples illustrate paste mix compositions which were prepared in accordance with the present invention. The battery grade lead oxide in these examples was obtained from Powerlab in Terrel, Tex. This oxide had an apparent density in the range of about 20-26 g/cu. in. and a free lead level of about 25 percent by weight.

EXAMPLE 1

| Component | Plate | |
| --- | --- | --- |
| | Positive | Negative |
| Battery grade leady oxide | 1000 g | 1000 g |
| Hydrogen peroxide (10 vol %) | 230 cc | 160 c |
| Expander | — | 18 g |
| Cube weight | 69 g/in$^3$ | 68 g/in$^3$ |

EXAMPLE 2

| | | |
| --- | --- | --- |
| Battery grade leady oxide | 1000 g | 1000 g |
| Hydrogen peroxide (10 vol %) | 130 cc | 97 cc |
| Expander | — | 20 g |
| Teflon (water dispersion) | 32.5 g | 32.5 g |
| Cube weight | 73 g/in$^3$ | 77 g/in$^3$ |

EXAMPLE 3

| | |
| --- | --- |
| Battery grade leady oxide | 750 g |
| Red lead (25% $Pb_3O_4$) | 250 g |
| Fiber (glass) | 20 g |
| Hydrogen peroxide (10 vol %) | 110 g |
| TEFLON ® (water dispersion) | 27 g |
| Cellulose | 13 g |
| $H_2O$ | 80 cc |
| Cube weight | 58 g/in$^3$ |

In Example 3, above, the red lead was a blend of 25% $Pb_3O_4$ and 75% PbO. In all of the examples, the hydrogen peroxide was "10 volumes" grade—i.e., gives off about 10 volumes of oxygen per volume of hydrogen peroxide. The "10 volumes" grade is equivalent to about 3% strength by weight.

The above pastes ware all prepared in accordance with the preferred method according to the present invention. The preferred method comprises the steps of:
1. Weighing battery grade lead oxide into the mixer.
2. If desired, adding in measured quantity of glass fiber and/or expander and dry mixing for 1 to 3 minutes.
3. With mixer running, adding an amount of hydrogen peroxide over 5 to 10 minutes. This facilitates uniform dispersion of the peroxide throughout the paste mix and complete oxidation of free lead in the paste.
4. Stopping mixer and checking cube weight and consistency. Variations of the Humboldt penetrometer or the Globe penetrometer are typically used for this purpose.
5. If desired, with the mixer running, adding in measured amounts of TEFLON ®, cellulose and water to obtain the desired cube weight and paste consistency.

Pastes prepared in accordance with the method aspect of the present invention have been studied in lead-acid cells and batteries which were cycled at two to five hour discharge rates for one cycle a day or on cycle-stand regime over periods of six to eight months without obvious plate degradation. FIG. shows a typical discharge at the 2.5 hour rate for both a conventional acid based paste and a hydrogen peroxide based paste.

While the invention has been explained by the description of specific embodiments, it is understood that various modifications and substitutions may be made in any of the embodiments within the scope of the appended claims which are intended to include equivalents of such embodiments.

What is claimed is:

1. A paste mix for use in prepared active battery plate material in a lead-acid battery, comprising:
   battery grade lead oxide containing free lead; and
   a quantity of hydrogen peroxide sufficient to oxidize the free lead and form a paste.

2. The paste mix of claim 1 further comprising a quantity of expander.

3. The paste mix of claim 1 further comprising a quantity of cellulose.

4. The paste mix of claim 1 further comprising a quantity of expander and a quantity of fibrous polyfluoroethylene.

5. The paste mix of claim 1 further comprising a quantity of cellulose and a quantity of fibrous polyfluoroethylene.

6. The method of forming a paste for application to a plate of a lead/acid battery which comprises mixing a battery grade lead oxide powder containing elemental lead with hydrogen peroxide in an amount sufficient to form a paste with the powder and to oxidize the elemental lead.

7. The method of claim 6, further comprising the step of adding a water dispersion of polyfluoroethylene, cellulose and water in amounts sufficient to obtain a desired cube weight and paste consistency.

8. The method claim 6 further comprising the step of adding an expander to the paste.

9. The method of claim 6 in which the mixture of powder and hydrogen peroxide is contacted for a period sufficient for the hydrogen peroxide to convert substantially all of the elemental lead to an oxide of lead.

10. The method of claim 9 in which the hydrogen peroxide comprises between 3 and 5 percent by weight of hydrogen peroxide in water.

11. The method of claim 9 in which the mixing is carried out at a temperature between about 15° C. and about 50° C.

12. The method of claim 11 in which the free lead comprises between about 15 and 30 percent of the mixture of powder.

13. A paste for a lead-acid battery grid which is made by mixing lead oxide powder containing free lead with hydrogen peroxide in an amount and for a time sufficient to form a paste substantially free of free lead.

14. The paste of claim 15 in which the lead oxide powder contains between about 15 and about 30 percent free lead.

15. The paste of claim 15 in which the mixing is performed at a temperature between about 15° C. and about 50° C.

* * * * *

UNITED STATES PATENT AND TRADEMARK OFFICE
CERTIFICATE OF CORRECTION

PATENT NO. : 4,909,955

DATED : March 20, 1990

INVENTOR(S) : Chris Morris, Ajoy Data, Paul L. Howard

It is certified that error appears in the above-identified patent and that said Letters Patent is hereby corrected as shown below:

Column 6, line 27 [claim 15] --claim 13--

Column 6, line 30 [claim 15] --claim 13--

Signed and Sealed this

Thirtieth Day of July, 1991

Attest:

HARRY F. MANBECK, JR.

*Attesting Officer*  *Commissioner of Patents and Trademarks*